(12) United States Patent
Diosdado Borrego et al.

(10) Patent No.: US 11,752,557 B2
(45) Date of Patent: Sep. 12, 2023

(54) LOADING BUILD MATERIAL POWDER FOR A 3D PRINTER

(71) Applicant: Hewlett-Packard Development Company, L.P., Spring, TX (US)

(72) Inventors: Jorge Diosdado Borrego, Barcelona (ES); David Chanclon Fernandez, Barcelona (ES); Pablo Antonio Murciego Rodriguez, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 22 days.

(21) Appl. No.: 17/236,350

(22) Filed: Apr. 21, 2021

(65) Prior Publication Data

US 2022/0339706 A1    Oct. 27, 2022

(51) Int. Cl.
| | |
|---|---|
| *B22F 10/34* | (2021.01) |
| *B22F 10/85* | (2021.01) |
| *B22F 12/49* | (2021.01) |
| *B33Y 10/00* | (2015.01) |
| *B33Y 30/00* | (2015.01) |
| *B33Y 40/00* | (2020.01) |
| *B22F 12/57* | (2021.01) |
| *B22F 10/10* | (2021.01) |

(52) U.S. Cl.
CPC .............. *B22F 10/34* (2021.01); *B22F 10/85* (2021.01); *B22F 12/49* (2021.01); *B22F 12/57* (2021.01); *B33Y 10/00* (2014.12); *B33Y 30/00* (2014.12); *B33Y 40/00* (2014.12); *B22F 10/10* (2021.01)

(58) Field of Classification Search
CPC .............. B23K 15/086; B28B 1/001; B22F 2003/1057
See application file for complete search history.

(56) References Cited

U.S. PATENT DOCUMENTS

| | | | | |
|---|---|---|---|---|
| 3,469,283 A | * | 9/1969 | Vinson | B22F 3/004 425/422 |
| 3,843,301 A | * | 10/1974 | Hijikata | B29C 51/18 264/510 |
| 2006/0141089 A1 | * | 6/2006 | Larsson | B29C 64/153 425/174 |
| 2007/0176032 A1 | * | 8/2007 | Russel-Smith | C04B 18/147 241/199.12 |
| 2009/0078335 A1 | * | 3/2009 | Stutzman | B65B 1/36 141/129 |

(Continued)

FOREIGN PATENT DOCUMENTS

| | | | |
|---|---|---|---|
| CN | 102967260 | * | 3/2013 |
| JP | H08266879 | * | 10/1996 |
| WO | WO 2021/061161 | | 4/2021 |

*Primary Examiner* — Nicholas A Wang
(74) *Attorney, Agent, or Firm* — SHOOK, HARDY & BACON, L.L.P.

(57) ABSTRACT

In one example, a system for loading a build material powder supply container for 3D printing includes a dispenser to dispense a build material powder into a supply container, a device to measure a density of the build material powder in the supply container, a compactor to compact the build material powder in the supply container, and a controller operatively connected to the measuring device and the compactor. The controller is programmed to control the compactor to compact the build material powder in the supply container until a measured density reaches a threshold density.

12 Claims, 8 Drawing Sheets

(56) References Cited

U.S. PATENT DOCUMENTS

2018/0021855 A1* 1/2018 De Lajudie ........... B29C 64/357
　　　　　　　　　　　　　　　　　　　　　　419/26
2019/0030606 A1* 1/2019 Mamrak ................ B33Y 40/00

* cited by examiner

LOADING BUILD MATERIAL POWDER FOR A 3D PRINTER

BACKGROUND 3D printers convert a digital representation of an object into a physical object. 3D printing includes any of various processes in which material is bound or solidified under computer control to create a three dimensional object. 3D printing is also commonly referred to as additive manufacturing. 3D printers are often used to manufacture objects with complex geometries using materials such as thermoplastics, polymers, ceramics and metals. In powder based 3D printing, successive layers of a powdered build material are formed and portions of each layer bound or fused in a desired pattern to build up the object.

DRAWINGS

FIGS. 2-10 illustrate an example system for loading build material powder into a supply container for a 3D printer. FIGS. 3-6 show a first stage loading partially filling the supply container. FIGS. 7-10 show a second stage loading fully filling the supply container. FIGS. 3, 5, 7, and 9 are sections viewed along the line 3-3 in FIG. 2.

FIGS. 4, 6, 8, and 10 are sections viewed along the line 4-4 in FIG. 2.

The same part numbers refer to the same or similar parts throughout the figures. The figures are not necessarily to scale.

DESCRIPTION

Metal objects may be printed by selectively applying a liquid binder to portions of each of successive layers of metal powder corresponding to a solid layer of the 3D object. The binder is cured, for example using heat and/or ultra violet light, to hold the metal powder particles together in the desired shape. The cured object, known commonly as a "green part," is heated in a sintering furnace to fuse the metal particles. Polymer objects may be printed by selectively applying a liquid, energy absorbing fusing agent to portions of each of successive layers of polymer powder and exposing the treated powder in each layer to light, heat and/or other electromagnetic radiation, causing the treated powder to heat up, coalesce, and fuse as part of the printing process.

In some 3D printing systems, objects are printed on a platform in a build chamber that is part of a build unit that also includes a powder supply container next to the build chamber. The build platform moves down incrementally inside the build chamber to receive each successive layer of build material for printing. The floor of the powder supply container moves up incrementally to present the desired quantity of build material powder to a layering device that spreads the next layer of powder over the build platform. The build unit may include a single supply container on only one side of the build platform or multiple supply containers on two (or more) sides of the build platform.

Build material powder is often loaded into a supply container at a single location in the center of the container, which tends to form a mound of powder near the center of the container. Powder in the mound near the top of the container is usually less dense than powder lower in the container. Uniform density throughout the volume of powder in a supply container utilizes the full capacity of the supply container more effectively and improves layering powder from the supply container over the build platform. A new loading process has been developed to help reduce mounding and increase uniformity by measuring the density of the powder in the supply container and compacting the powder until the measured density reaches a threshold density. The threshold density serves as a proxy for uniformity—as powder in the supply container is compacted to a higher density, the density throughout the volume becomes more uniform.

In one example, density is measured using a 3D scanner to determine the shape (in three dimensions) of the surface of the powder in the supply container. The surface shape is compared to a target shape representing the desired density. For example, a more mounded surface shape indicates a lower density and less uniformity while a flatter surface shape indicates a higher density and greater uniformity. Powder in the supply container is compacted until the surface shape matches the target shape. The shape comparison may be made, for example, using an algorithm or look-up table that relates different surface shapes to corresponding densities.

In another example, density is measured by measuring the current drawn by a motor driving the compactor and comparing the measured current to a target current representing the threshold density. As the powder in the supply container is compacted and becomes more dense, the compactor motor will draw more current. Powder in the supply container is compacted until the measured current matches the target current. The current comparison may be made, for example, using an algorithm or look-up table that relates different motor currents to corresponding densities.

These and other examples described herein illustrate but do not limit the scope of the patent which is defined in the Claims following this Description.

As used in this document: "and/or" means one or more of the connected things; a "computer readable medium" means any non-transitory tangible medium that can embody, contain, store, or maintain programming for use by a computer processor and may include, for example, circuits, integrated circuits, ASICs (application specific integrated circuits), hard drives, random access memory (RAM), read-only memory (ROM), and memory cards and sticks; "density" means bulk density (not the density of a particle in the powder); a "density measuring device" means any device that measures something used to determine bulk density including, for example, a 3D scanner or an ammeter as described below; and "powder" means consisting of small particles.

Figure 1:
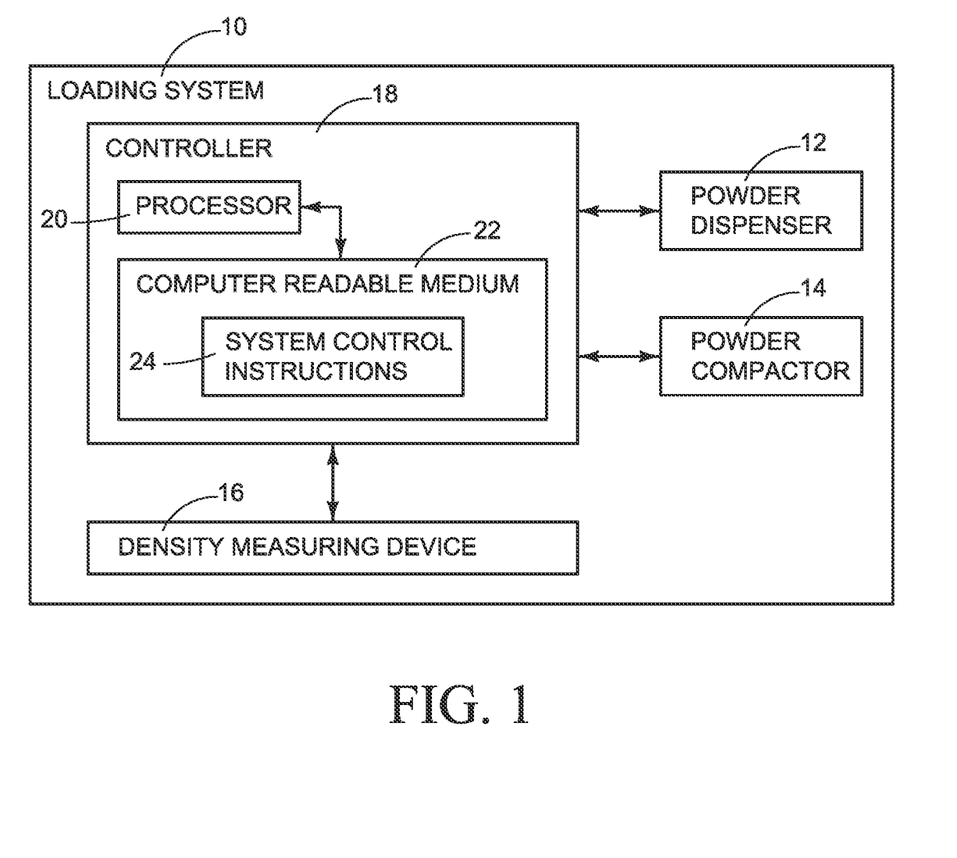
FIG. 1 illustrates an example system for loading build material powder into a supply container for a 3D printer.

FIG. 1 illustrates an example system 10 for loading build material powder into a supply container for a 3D printer. Referring to FIG. 1, loading system 10 includes a dispenser 12 to dispense build material powder into a supply container, a compactor 14 to compact powder in the container, and a density measuring device 16 to measure the density of powder in the container during loading. System 10 also includes a controller 18 operatively connected to dispenser 12, compactor 14, and measuring device 16. Controller 18 includes the programming, processing and associated memory resources, and the other electronic circuitry and components to control the operative elements of system 10. Controller 18 may include distinct control elements for individual system components. In particular, controller 18 in FIG. 1 includes a processor 20 and a computer readable medium 22 with system control instructions 24 operatively connected to processor 20.

System control instructions 24 represent programming that enables controller 18 to control compactor 14 and dispenser 12 during loading based on feedback from density measuring device 16. As dispenser 12 dispenses build material powder into a supply container, compactor 14 compacts the powder in the container and device 16 measures the density of that powder. In an example, density measuring device 16 is implemented as a 3D scanner that scans at least some of the top surface of the powder in three dimensions. Processor 20 executing instructions 24 determines (1) the shape of the top surface based on a 3D scan and (2) that the measured density has reached a threshold density by comparing the surface shape to a target shape representing the threshold density. In another example, measuring device 16 is implemented as an ammeter that measures current drawn by the compactor motor. Processor 20 executing instructions 24 determines that the measured density has reached a threshold density by comparing the measured current to a target current representing the threshold density.

When controller 18 determines the measured density has reached the threshold density and no further compaction is desired, controller 18 stops compactor 14 from further compacting the build material powder in the supply container. If no more powder is to be loaded into the supply container after the threshold density is reached, then controller 18 may also stop dispenser 12 from dispensing any more powder into the supply container. In addition to stopping compaction when the threshold density is reached, the measured density may be used to regulate compaction during loading. For example, as the measured density increases during loading, controller 18 may change the force, frequency, and/or duration of compaction. In addition to stopping dispensing when the threshold density is reached, the measured density may be used to regulate dispensing during loading. For example, controller 18 may change the rate and/or duration of dispensing during loading.

Figure 2:
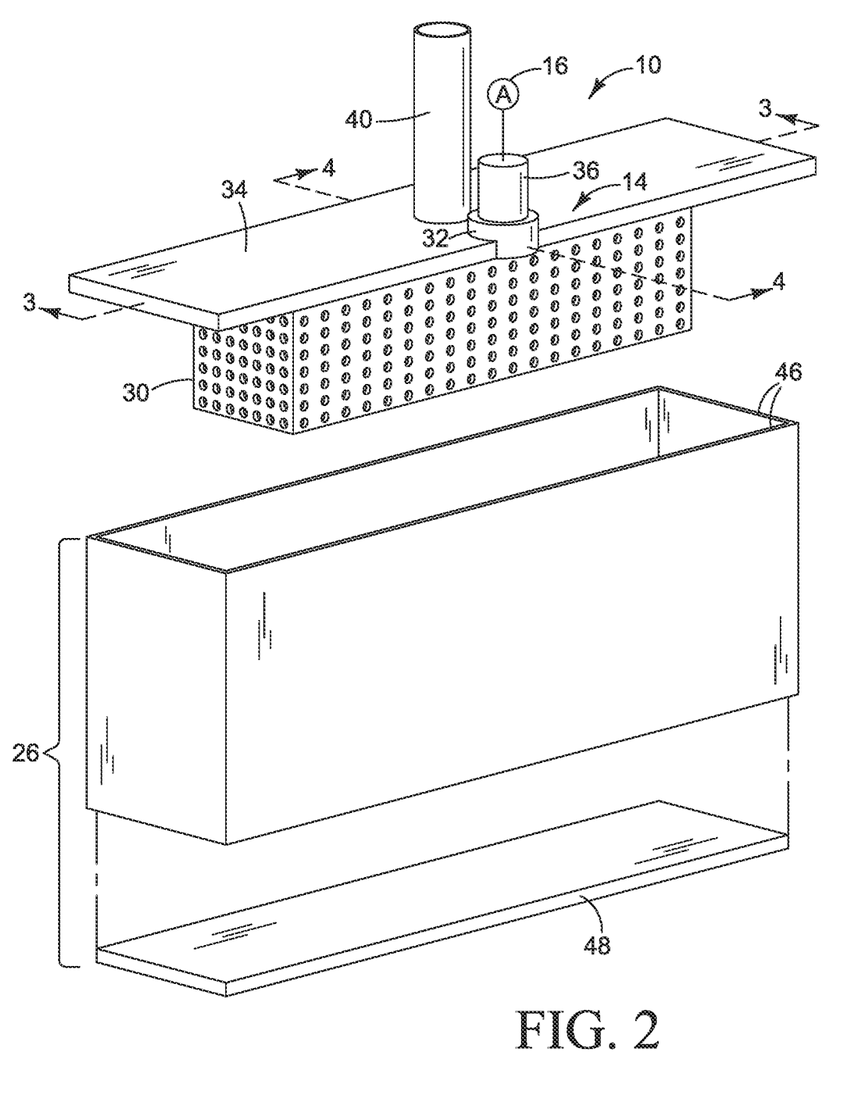
Figure 3:
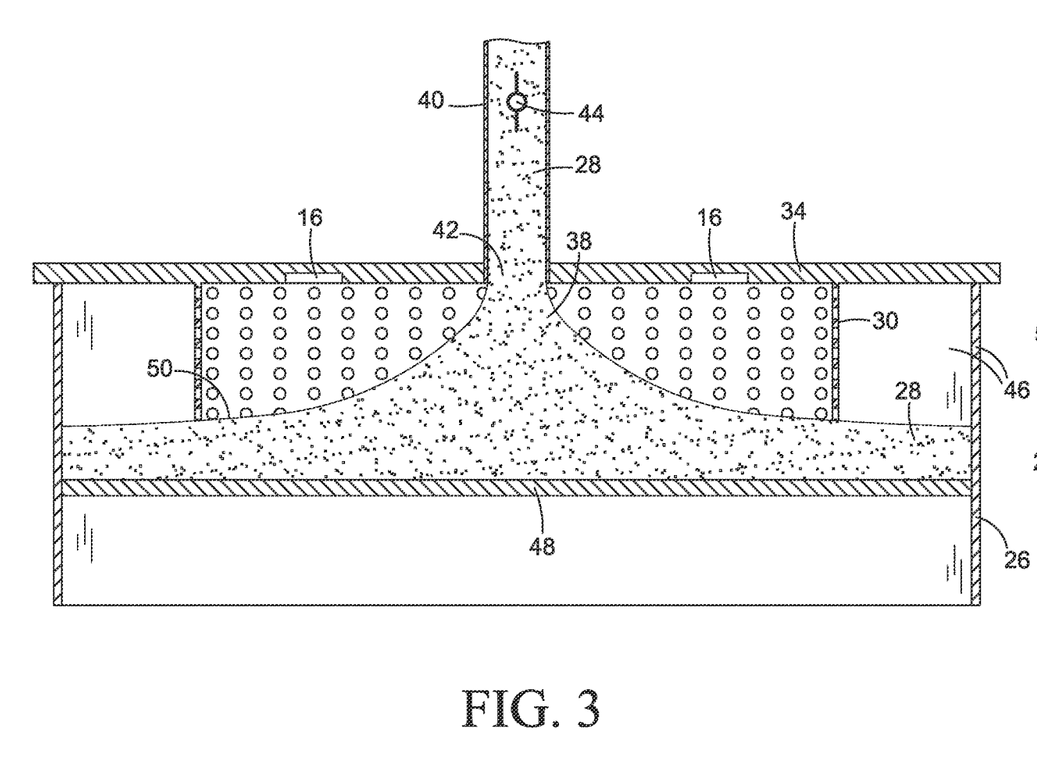
Figure 4:
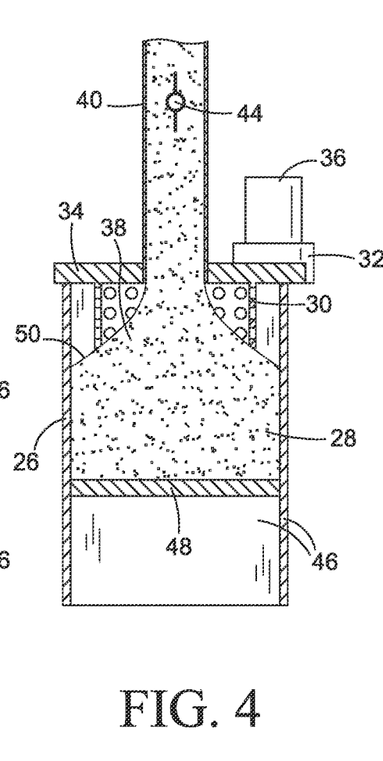
Figure 5:
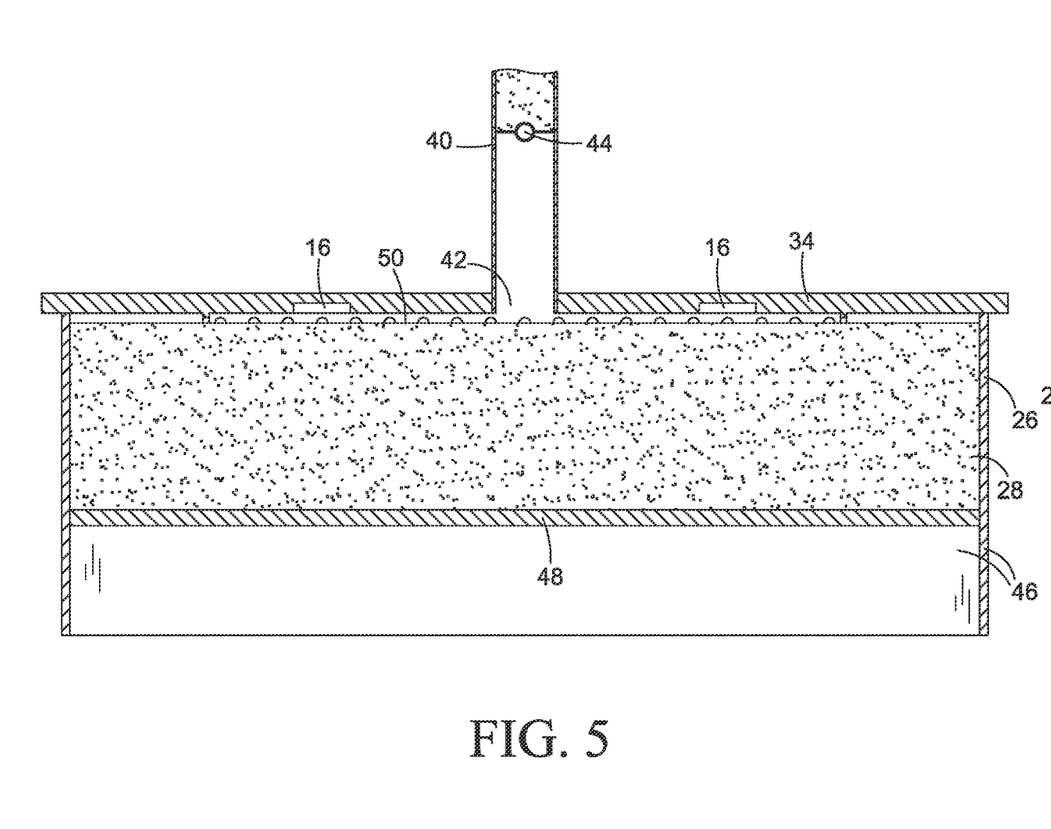
Figure 6:
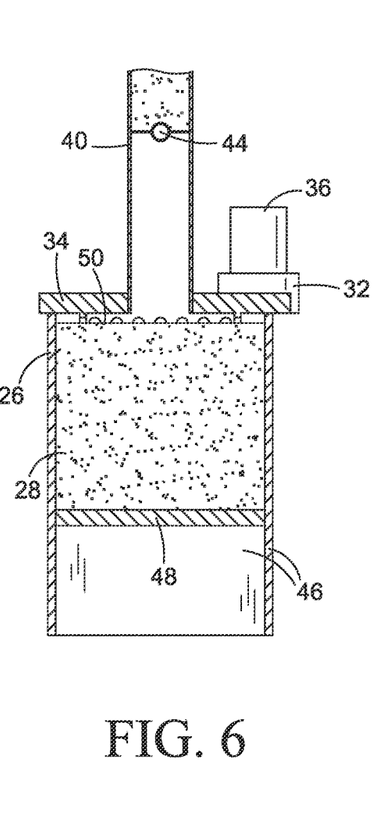
Figure 7:
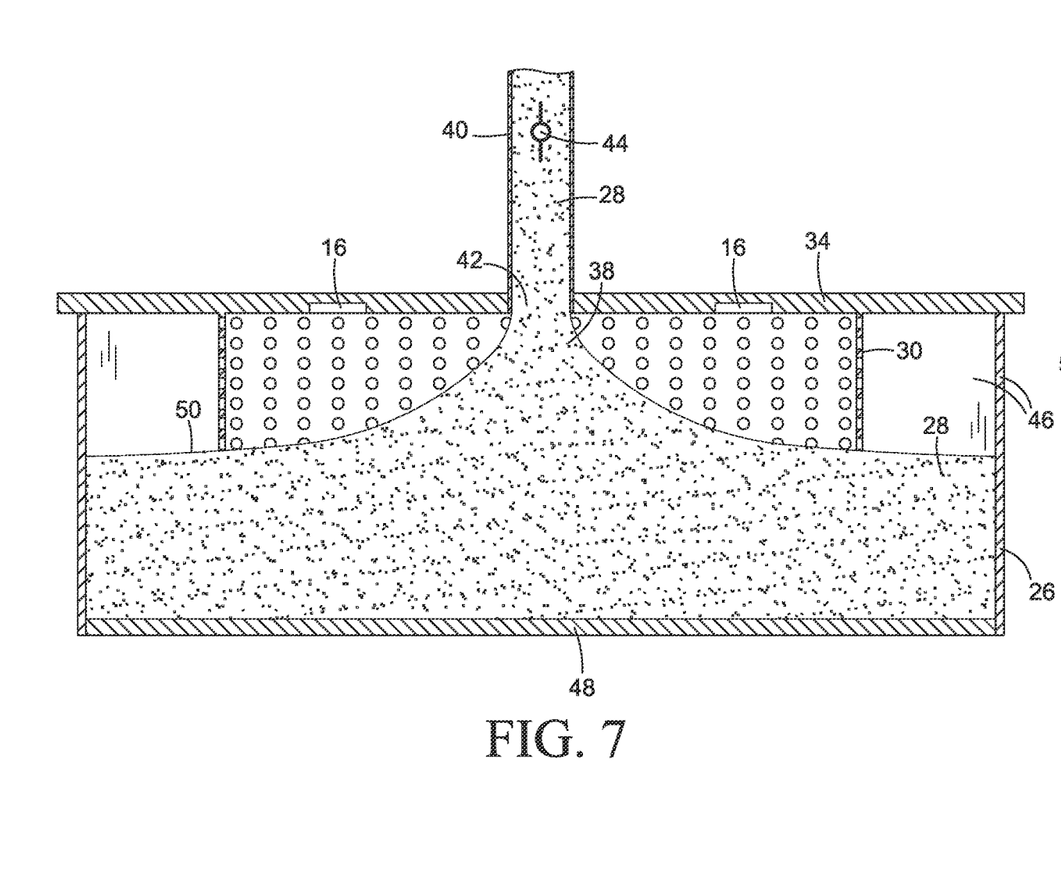
Figure 8:
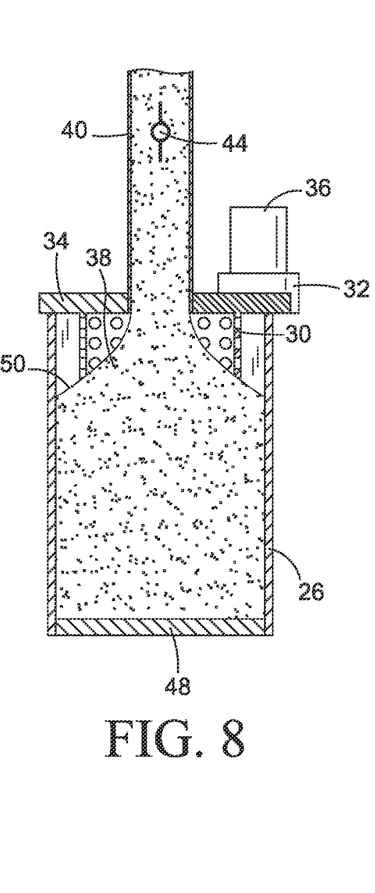
Figure 9:
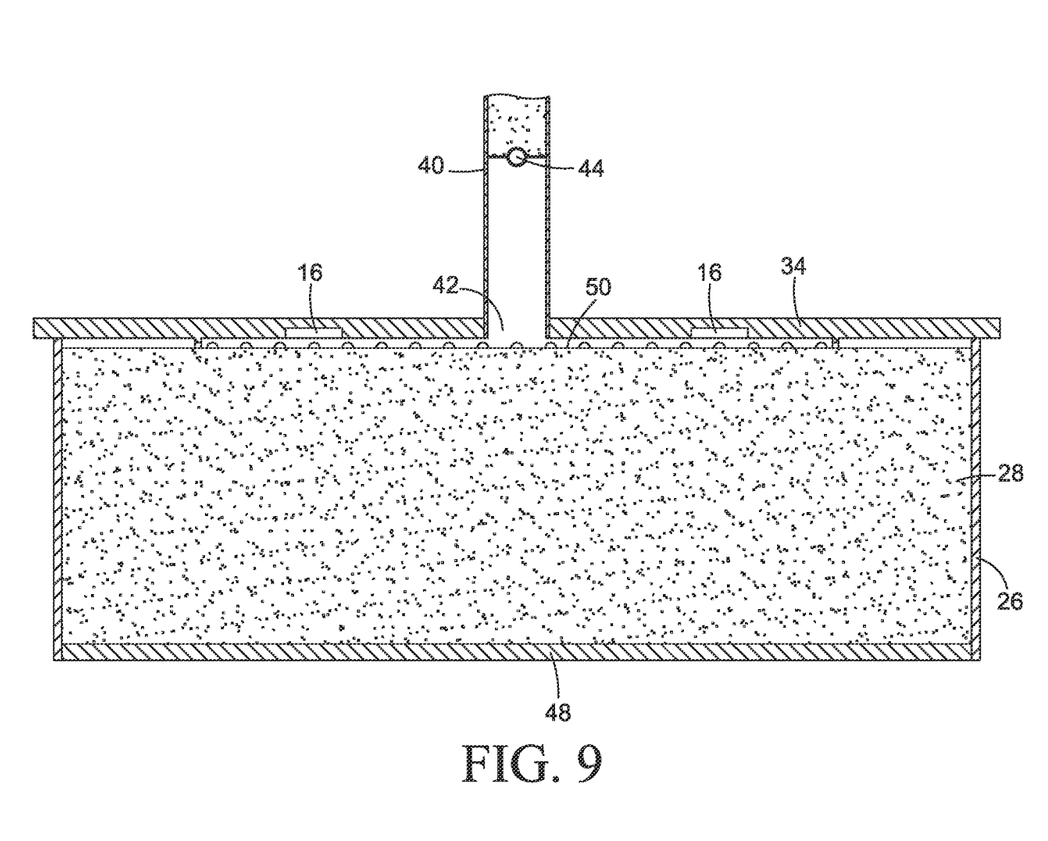
Figure 10:
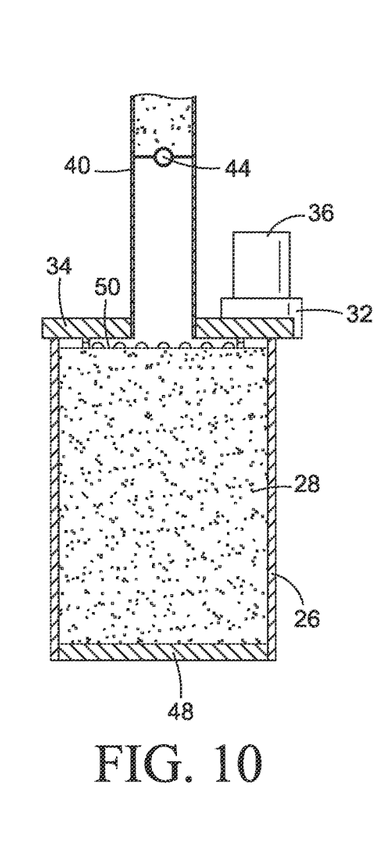

FIGS. 2-10 illustrate an example system 10 for loading build material powder into a supply container 26 for a 3D printer. FIG. 2 shows system 10 before powder is dispensed into supply container 26. FIGS. 3, 5, 7, and 9 are sections viewed along the line 3-3 in FIG. 2. FIGS. 4, 6, 8, and 10 are sections viewed along the line 4-4 in FIG. 2.

Referring to FIGS. 2-10, loading system 10 includes a compactor 14 and a density measuring device 16. Compactor 14 includes a movable compaction element 30 and an actuator 32 operatively connected to element 30. Actuator 32 controls the movement of compaction element 30 at the direction of a controller 18 shown in FIG. 1. In the example shown in FIGS. 2-10, compaction element 30 is implemented as a screen mounted to the underside of a base 34, so that screen 30 extends down in to the powder 28 in a supply container 26, and actuator 32 is implemented as a motor driven vibrator. Vibrator 32 vibrates base 34 and thus screen 30 at the urging of a motor 36. The movement of screen 30 causes powder 28 to settle, become more compact and thus more dense, and flattens the mound 38 under dispenser 12, as best seen by comparing FIGS. 3, 4 and 5, 6.

FIGS. 2-10 show a continuous single rectangular screen 28 that follows the perimeter of a rectangular supply container 26. Other configurations for the compactor element and supply container are possible. For example, multiple screens 28 nested one within another could be used and/or with discrete segments that allow the powder to flow more freely toward the perimeter of container 26. Another type of actuator 32 could be used. For example, one or multiple actuators 32 could be used to move a corresponding one or multiple blades or other compactor elements 28 up and down and/or side to side to compact and distribute powder 28 in supply container 26.

Dispenser 12 (FIG. 1) includes a conduit 40 coupled to base 34 at an opening 42. Conduit 40 is operatively connected to a powder source (not shown). Powder is pumped or otherwise delivered to conduit 40 from the source and into a supply container 26 through opening 42. Dispenser 12 (FIG. 1) may include a valve 44 to regulate the flow of powder to or through conduit 40, for example at the direction of a controller 18 shown in FIG. 1. Other configurations fora dispenser 12 are possible. For example, powder could be loaded into container 26 from the bottom or sides and/or using an auger, pump, or another type of transfer mechanism.

Loading system 10 is engaged with a supply container 26 for loading powder 28 in the container 26, as shown in FIGS. 3-10. FIG. 2 shows loading system 10 in a disengaged position above a powder supply container 26. Supply container 26 includes sidewalls 46 and a floor 48. Floor 48 is shown exploded away from sidewalls 46 in FIG. 2. In this example, floor 48 moves up and down for loading in stages. FIGS. 3-6 show a first stage loading in which floor 48 is about midway in container 26. FIGS. 7-10 show a second stage loading in which floor 48 is at the bottom of container 26. During printing, floor 48 moves up incrementally to present the desired quantity of build material powder 28 for a layering device to spread the next layer of powder over a build platform next to the supply container.

Powder may be dispensed through conduit 40 into container 26 continuously throughout the entire loading process, continuously during each stage of the loading process (where there are multiple stages), or intermittently in discrete amounts. In one example, compactor 14 compacts build material powder 28 while powder 28 is dispensed into container 26. In another example, compactor 14 compacts powder 28 intermittently only when powder 28 is not being dispensed into container 26.

When engaged for loading, base 34 may cover and seal the top of supply container 26, as shown in FIGS. 3-10, to help prevent airborne powder inside and outside container 26. In one example, system 10 with base 34 is moved down to engage supply container 26 for loading. In another example, supply container 26 is moved up to engage base 34 for loading.

Figure 11:
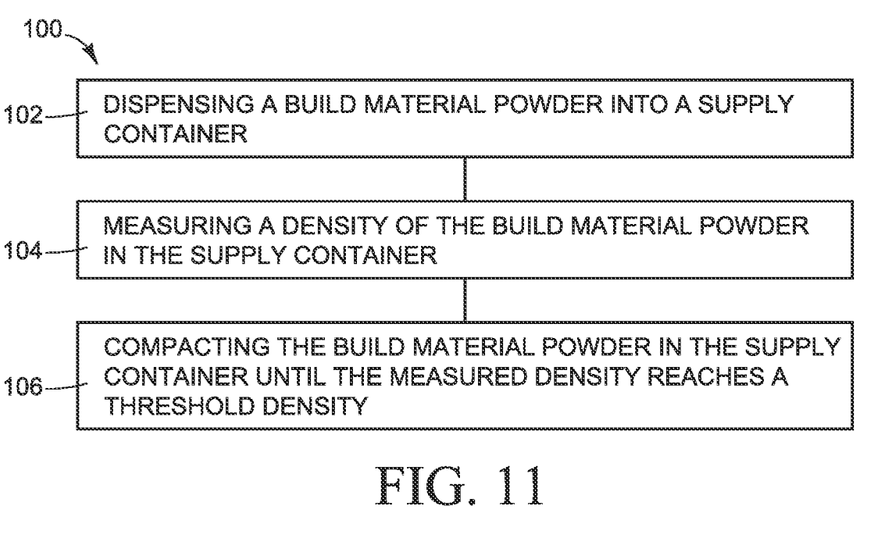
FIGS. 11-13 illustrate example processes for loading a build material powder supply container for a 3D printer.

FIG. 11 illustrates an example process 100 for loading a build material powder supply container for 3D printing, such as might be implemented by a processor 20 executing instructions 24 on controller 18 in FIG. 1. Referring to FIG. 11, loading process 100 includes dispensing a build material powder into a supply container (block 102), measuring a density of the build material powder in the supply container (block 104), and compacting the build material powder in the supply container until the measured density reaches a threshold density (block 106). For example, controller 12 in FIG. 1 is programmed to turn off compactor 14 when the measured density reaches the threshold density, as shown in FIGS. 5, 6 and 9, 10. Process 100 may also include dispensing build material powder into the supply container until the measured density reaches the threshold density. For example, controller 12 in FIG. 1 is programmed to close valve 44 to stop the flow powder 28 into container 26 when the measured density reaches the threshold density, as shown in FIGS. 5, 6 and 9, 10.

For multiple stage loading, the actions in blocks 102, 104, and 106 in FIG. 11 are performed for each stage. For example, for two stage loading such as that shown in FIGS. 3-10, a loading process 100 from FIG. 11 includes: dispensing a first quantity of build material powder into the supply container (block 102); measuring a density of the first quantity of build material powder in the supply container (block 104); compacting the first quantity of build material powder in the supply container until the measured density of the first quantity of build material powder reaches a threshold density (block 106); and then, after compacting the first quantity of powder in the supply container, dispensing a second quantity of build material powder into the supply container (block 102); measuring a density of the second quantity of build material powder in the supply container (block 104); and compacting the second quantity of build material powder in the supply container until the measured density of the second quantity of build material powder reaches the threshold density (block 106).

Figure 12:
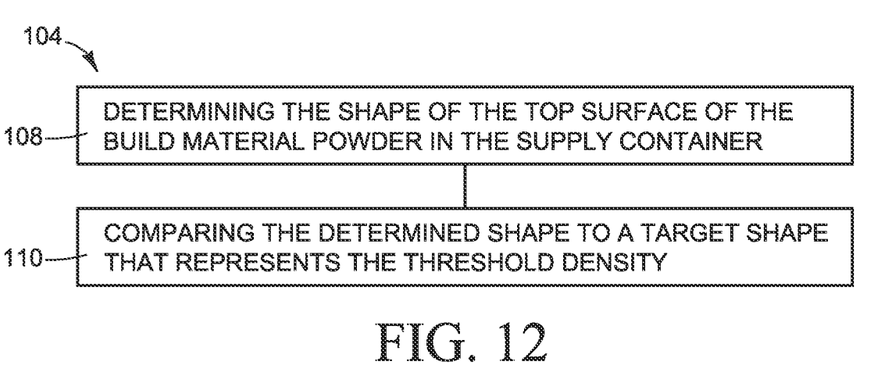

FIG. 12 illustrates an example process for measuring the density of the powder in the supply container at block 104 in FIG. 11. Referring to FIG. 12, measuring the density of the powder includes determining the shape of the top surface of build material powder in the supply container (block 108) and comparing the determined shape to a target shape that represents the threshold density (block 110). For example, the density measuring device may be implemented as a laser, stereoscopic, photometric or other suitable 3D scanner 16 mounted to the underside of base 34 as shown in FIGS. 3, 5, 7, and 9. In the example shown in FIGS. 3, 5, 7, and 9, dual scanners 16 on each side of powder flow opening 42 are used to scan the surface 50 of powder 28 in supply container 26.

Figures 14, 15:
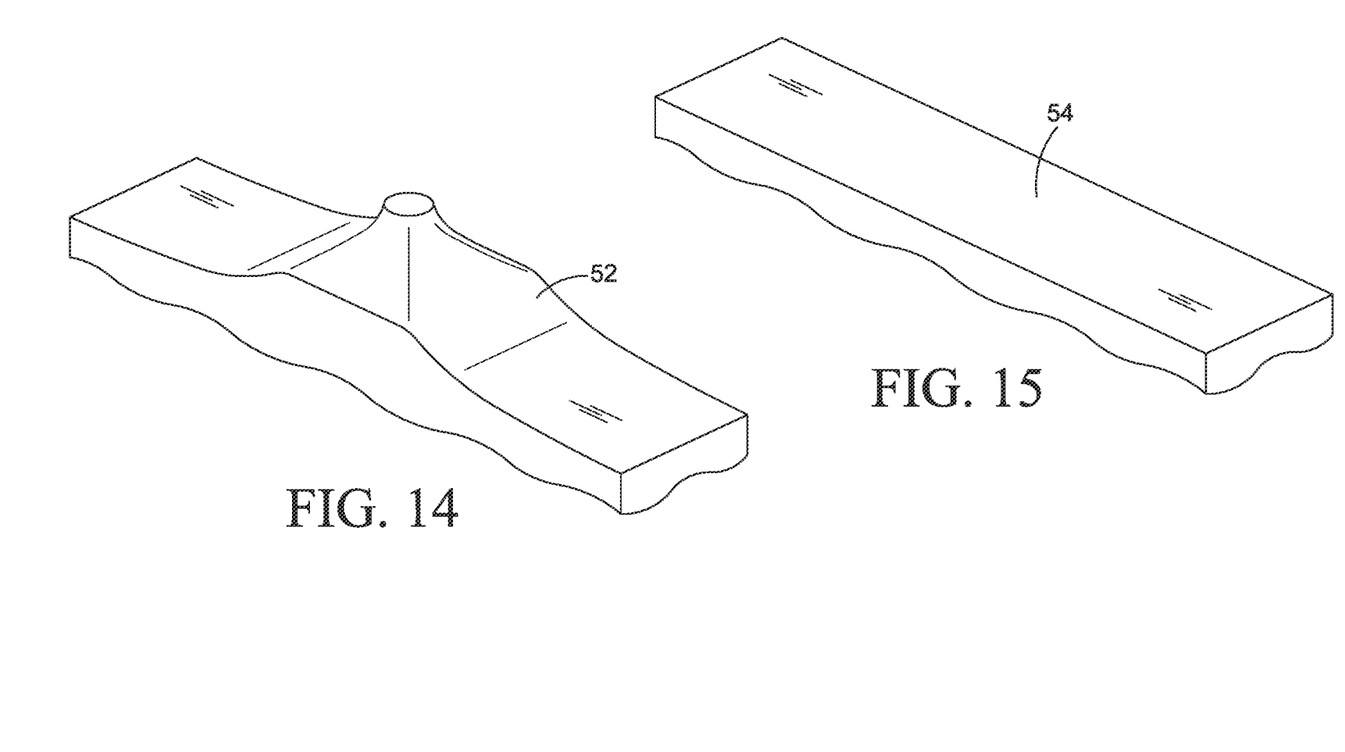
FIGS. 14 and 15 illustrate surface shapes for build material powder loaded into a supply container for a 3D printer.

Data from the 3D scanner(s) may be used by controller 18 in FIG. 1 to construct a digital model of the surface shape of the powder. FIG. 14 illustrates a surface shape 52 corresponding to a mounded powder surface 50 in FIGS. 3, 4 and 7, 8. FIG. 15 illustrates a surface shape 54 corresponding to a flat powder surface 50 in FIGS. 5, 6 and 9, 10. Powder in the supply container is compacted at block 106 in FIG. 11 until the surface shape matches the target shape, for example surface shape 54 in FIG. 15. The shape comparison at block (110) in FIG. 12 may be made, for example, by controller 12 in FIG. 1 using an algorithm or look-up table that relates different 3D surface shapes to corresponding densities. In another example, the shape comparison is made by controller 12 in FIG. 1 using the surface shape to determine the volume of powder in the container and then computing a ratio between the weight and volume of the powder loaded into the container (e.g., kg/l).

In the example shown in FIGS. 3-10, the 3D scanning function is implemented at the loading station with scanners 16 that are part of loading system 10. In other examples, the 3D scanning function may be implemented at an inspection station separate from the loading station, for example if airborne powder in the container obscures the scanners. The supply container may be moved back and forth between the loading station and the inspection station until loading is completed.

Figure 13:
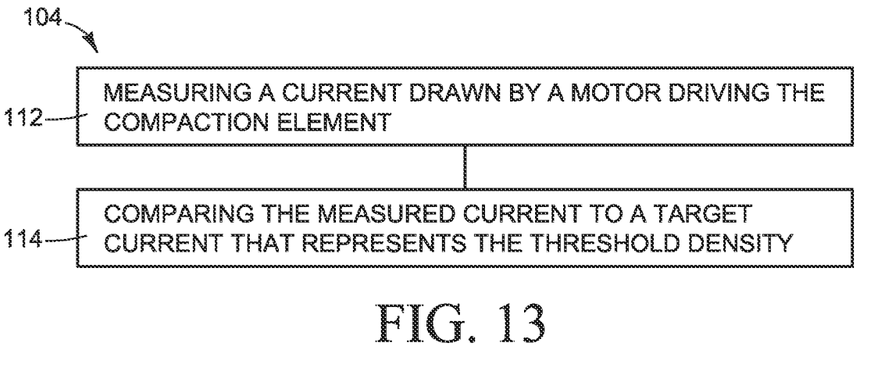

FIG. 13 illustrates another example process for measuring the density of the powder in the supply container at block 104 in FIG. 11. Referring to FIG. 13, measuring the density of the powder includes measuring the current drawn by a motor driving the compaction element (block 112) and comparing the measured current to a target current that represents the threshold density (block 114). For example, the density measuring device may be implemented as an ammeter 16 in FIG. 2 that measures the current of motor 36 driving vibrator 32. The current comparison may be made, for example, using an algorithm or look-up table that relates different motor currents to corresponding densities.

These and other examples shown in the figures and described below illustrate but do not limit the patent, which is defined in the following Claims.

"A" and "an" used in the claims means one or more. For example, "a" measuring device in the claims means one or more measuring devices and subsequent reference to "the" measuring device means the one or more measuring devices.

The invention claimed is:

1. A system for loading a build material powder supply container for 3D printing, the system comprising:
   a dispenser to dispense a build material powder into a supply container;
   a device to measure a density of the build material powder in the supply container to obtain a measured density;
   a compactor to compact the build material powder in the supply container; and
   a controller operatively connected to the dispenser, the measuring device and the compactor, the controller programmed to:
      use the measured density to control a flow rate of the build material powder from the dispenser into the supply container, wherein when the measured density increases, the controller decreases the flow rate of the build material powder from the dispenser into the supply container; and
      control the compactor to compact the build material powder in the supply container until the measured density reaches a threshold density.

2. The system of claim 1, wherein the controller is operatively connected to the dispenser and programmed to control the dispenser to dispense build material powder into the supply container continuously until the measured density reaches the threshold density.

3. The system of claim 1, wherein:
   the measuring device comprises a 3D scanner to scan a top surface of the build material powder in the supply container; and
   the controller is programmed to:
      determine a shape of the top surface based on a scan of the top surface; and
      determine that the measured density has reached the threshold density based on a comparison of the determined shape to a target shape representing the threshold density.

4. The system of claim 1, wherein:
   the compactor comprises a motor driven vibrator;
   the measuring device comprises an ammeter to measure a current drawn by a motor driving the vibrator; and
   the controller is programmed to determine that the measured density has reached the threshold density based on a comparison of the measured current to a target current representing the threshold density.

5. The system of claim 1, wherein the controller is operatively connected to the dispenser and programmed to:
   control the dispenser to dispense a first quantity of build material powder into the supply container;
   control the measuring device to measure a density of the first quantity of build material powder in the supply container;

control the compactor to compact the first quantity of build material powder in the supply container until the measured density of the first quantity of build material powder reaches a threshold density;

control the dispenser to dispense a second quantity of build material powder into the supply container over the first quantity;

control the measuring device to measure a density of the second quantity of build material powder in the supply container; and control the compactor to compact the second quantity of build material powder in the supply container until the measured density of the second quantity of build material powder reaches the threshold density.

6. A system for loading a build material powder supply container for 3D printing, the system comprising:

a dispenser to dispense a build material powder into a supply container;

a device to measure a density of the build material powder in the supply container to obtain a measured density;

a compactor to compact the build material powder in the supply container until the measured density of the build material powder in the supply container reaches a threshold density; and dispenser programming to use the measured density to control a flow rate of the build material powder from the dispenser into the supply container until the measured density reaches the threshold density, wherein the flow rate is increased or decreased in response to the measured density compared to the threshold density.

7. The system of claim 6, comprising compactor programming to control the compactor to compact the build material powder in the supply container until the measured density reaches the threshold density.

8. The system of claim 7, wherein the compactor programming is implemented in a controller operatively connected to the dispenser, the measuring device and the compactor.

9. The system of claim 6, wherein the dispenser programming is implemented in a controller operatively connected to the dispenser, the measuring device and the dispenser.

10. A system for loading a build material powder supply container for 3D printing, the system comprising:

a dispenser to dispense a build material powder into a supply container;

a device to measure a density of the build material powder in the supply container to obtain a measured density;

a compactor to compact the build material powder in the supply container;

a controller operatively connected to the dispenser, the measuring device and the compactor, the controller programmed to:

use the measured density to increase or decrease a flow rate of the build material powder from the dispenser into the supply container;

control the compactor to compact the build material powder in the supply container until a measured density reaches a threshold density; and wherein:

the measuring device comprises a 3D scanner to scan a top surface of the build material powder in the supply container; and the controller is programmed to:
determine a shape of the top surface based on a scan of the top surface; and
determine that the measured density has reached the threshold density based on a comparison of the determined shape to a target shape representing the threshold density; and/or the compactor comprises a motor driven vibrator;
the measuring device comprises an ammeter to measure a current drawn by a motor driving the vibrator; and
the controller is programmed to determine that the measured density has reached the threshold density based on a comparison of the measured current to a target current representing the threshold density.

11. The system of claim 10, wherein:
the measuring device comprises a 3D scanner to scan a top surface of the build material powder in the supply container; and
the controller is programmed to:
determine a shape of the top surface based on a scan of the top surface; and
determine that the measured density has reached the threshold density based on a comparison of the determined shape to a target shape representing the threshold density.

12. The system of claim 10, wherein:
the compactor comprises a motor driven vibrator;
the measuring device comprises an ammeter to measure a current drawn by a motor driving the vibrator; and
the controller is programmed to determine that the measured density has reached the threshold density based on a comparison of the measured current to a target current representing the threshold density.

* * * * *